United States Patent
Rubens

(10) Patent No.: US 10,512,978 B2
(45) Date of Patent: Dec. 24, 2019

(54) BLADE AND BLADE ATTACHMENT SYSTEM FOR AN OSCILLATING TOOL

(71) Applicants: Robert Bosch GmbH, Stuttgart (DE); Jeremy Rubens, Palatine, IL (US)

(72) Inventor: Jeremy Rubens, Palatine, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 172 days.

(21) Appl. No.: 15/315,125

(22) PCT Filed: Jun. 16, 2015

(86) PCT No.: PCT/US2015/035954
§ 371 (c)(1),
(2) Date: Nov. 30, 2016

(87) PCT Pub. No.: WO2015/195615
PCT Pub. Date: Dec. 23, 2015

(65) Prior Publication Data
US 2017/0106457 A1 Apr. 20, 2017

Related U.S. Application Data

(60) Provisional application No. 62/012,564, filed on Jun. 16, 2014.

(51) Int. Cl.
*B23D 61/00* (2006.01)
*B25F 5/00* (2006.01)
*B27B 19/00* (2006.01)
*B23D 51/10* (2006.01)

(52) U.S. Cl.
CPC .......... *B23D 61/006* (2013.01); *B23D 51/10* (2013.01); *B25F 5/006* (2013.01); *B27B 19/006* (2013.01)

(58) Field of Classification Search
CPC .... B23D 61/006; B23D 51/10; B27B 19/006; B25F 5/006
See application file for complete search history.

(56) References Cited

U.S. PATENT DOCUMENTS

| | | | | |
|---|---|---|---|---|
| 2,557,364 A | * | 6/1951 | Treace | B23D 61/006 606/178 |
| 3,437,852 A | * | 4/1969 | Cox | B26B 19/282 310/36 |

(Continued)

OTHER PUBLICATIONS

International Search Report corresponding to PCT Application No. PCT/US2015/195615, dated Aug. 25, 2015 (3 pages).
SM Products, LLC, "Spyder Product Catalog", 2013 (32 pages).

*Primary Examiner* — Jonathan G Riley
(74) *Attorney, Agent, or Firm* — Maginot, Moore & Beck LLP

(57) ABSTRACT

A handheld oscillating tool includes a blade attachment system having a tool mounting portion configured to enable the tool mounting portion to be releasably secured to a tool holder of an oscillating tool such that the blade attachment system oscillates with the tool holder and a blade mounting portion configured to releasably retain a blade with a planar body of the blade arranged substantially perpendicular to the oscillation axis and with one of the leading edge and the trailing edge of the blade positioned forwardly with respect to the tool mounting portion.

10 Claims, 5 Drawing Sheets

(56) References Cited

U.S. PATENT DOCUMENTS

| | | | | |
|---|---|---|---|---|
| 3,554,197 A * | 1/1971 | Dobbie | ............... | B23Q 5/027 30/392 |
| 4,106,181 A * | 8/1978 | Mattchen | ............... | A61C 3/12 279/77 |
| 4,920,652 A | 5/1990 | Johnson | | |
| 5,062,338 A | 11/1991 | Baker | | |
| 5,263,972 A * | 11/1993 | Evans | ............... | B23D 51/10 30/339 |
| 5,366,312 A * | 11/1994 | Raines | ............... | B24B 45/00 403/3 |
| 5,382,249 A * | 1/1995 | Fletcher | ............... | B23D 51/10 606/176 |
| 6,113,618 A * | 9/2000 | Nic | ............... | B23D 61/006 30/351 |
| 6,810,782 B2 * | 11/2004 | Wuensch | ............... | B23D 51/10 279/102 |
| 6,854,187 B2 * | 2/2005 | Huan | ............... | B23D 51/10 279/77 |
| 8,317,574 B2 * | 11/2012 | Blickle | ............... | B24B 23/02 294/94 |
| D681,082 S * | 4/2013 | Neal, Jr. | ............... | D15/139 |
| 8,523,868 B2 * | 9/2013 | Boykin | ............... | A61B 17/142 606/82 |
| 10,011,036 B2 * | 7/2018 | Rubens | ............... | B23D 51/10 |
| 10,040,215 B2 * | 8/2018 | Rubens | ............... | B23D 51/10 |
| 2009/0320625 A1 | 12/2009 | Kildevaeld | | |
| 2010/0018065 A1 * | 1/2010 | Janssson | ............... | B23D 51/10 30/517 |
| 2010/0218389 A1 | 9/2010 | Kalomeris et al. | | |
| 2011/0072946 A1 | 3/2011 | Bernardi et al. | | |
| 2011/0266758 A1 | 11/2011 | Sergyeyenko et al. | | |
| 2011/0266759 A1 * | 11/2011 | Goldman | ............... | B24B 23/04 279/106 |
| 2012/0066919 A1 | 3/2012 | Holba et al. | | |
| 2012/0144676 A1 * | 6/2012 | Davidian | ............... | B23D 61/006 30/142 |
| 2012/0289963 A1 * | 11/2012 | Legrand | ............... | B27B 5/32 606/79 |
| 2013/0174701 A1 | 7/2013 | Elliston et al. | | |
| 2013/0181414 A1 | 7/2013 | Haman | | |
| 2014/0000117 A1 | 1/2014 | Novak et al. | | |

* cited by examiner

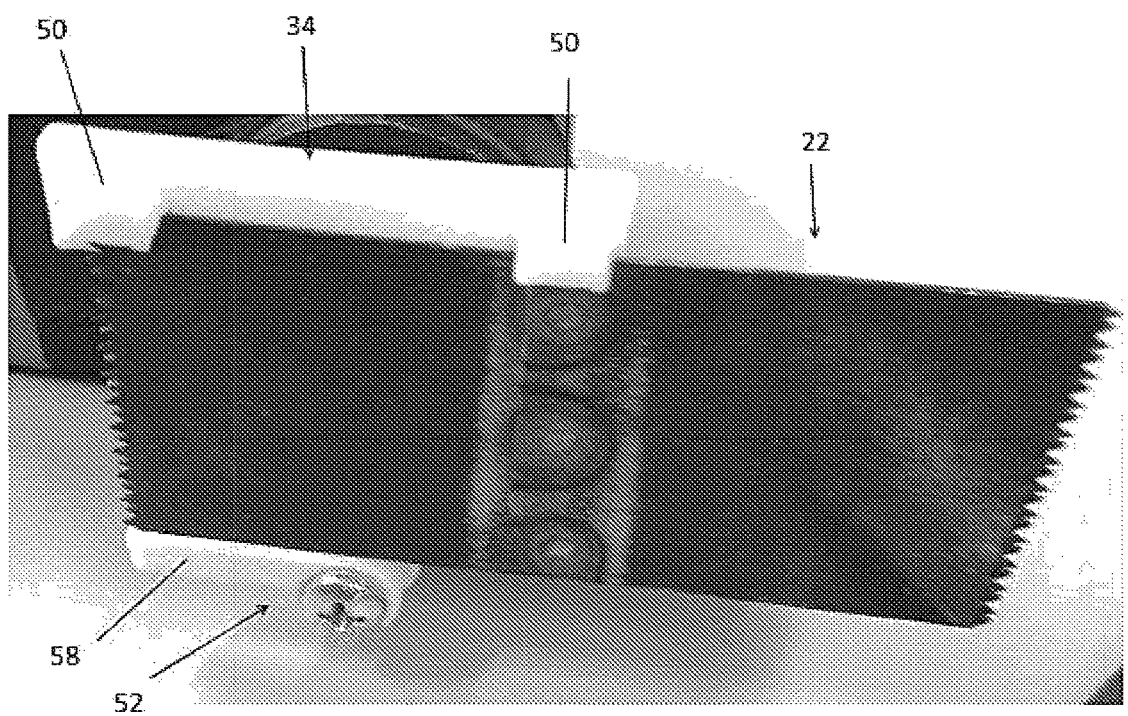
FIG. 7
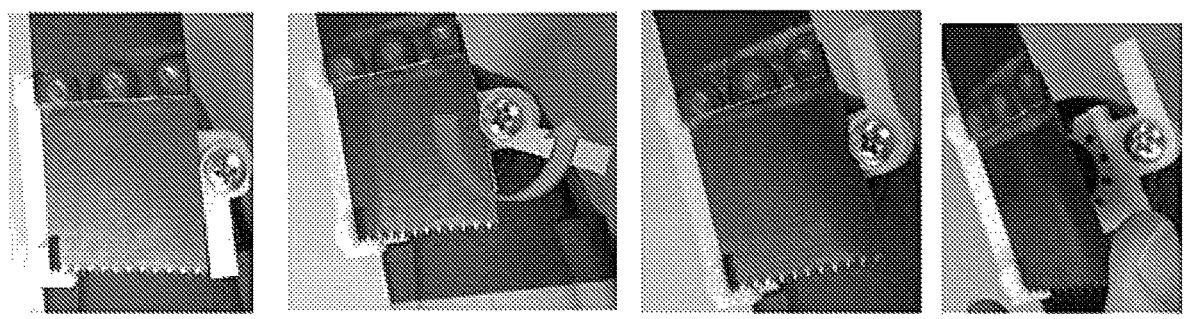
Locked
FIG. 8a
Rotate
FIG. 8b
Unlocked
FIG. 8c
Remove blade
FIG. 8d

BLADE AND BLADE ATTACHMENT SYSTEM FOR AN OSCILLATING TOOL

CROSS-REFERENCE TO RELATED APPLICATIONS

This application is a 35 U.S.C. § 371 National Stage Application of PCT/US2015/035954, filed on Jun. 16, 2015, which claims the benefit of priority to U.S. Provisional Application No. 62/012,564, filed on Jun. 16, 2014 and entitled "Blade and Blade Attachment System for an Oscillating Tool," the disclosures of which are incorporated herein by reference in their entireties.

TECHNICAL FIELD

The disclosure relates generally to oscillating power tools, and more particularly to blades and blade attachment systems for oscillating power tools.

BACKGROUND

In general, oscillating tools are light-weight, handheld power tools capable of being equipped with a variety of tool accessories and attachments, such as cutting blades, sanding discs, grinding tools, and many others. These types of tools, referred to hereinafter as power tools, typically include a generally cylindrically-shaped main body that serves as an enclosure for an electric motor as well as a hand grip for the tool. The electric motor is operably coupled to a drive member, referred to herein as a tool holder, that extends from a portion of the main body of the power tool. The electric motor is configured to rotate and/or oscillate the tool holder at relatively high frequencies.

The tool holder in turn is configured to secure different accessory tools so that as the tool holder is driven to move by the electric motor, an accessory tool secured to the holder is driven to perform work on a workpiece. Referring to FIG. 3, accessory tools 2 for oscillating power typically have a mounting portion 3 and a work portion 4. The mounting portion 3 is configured to interface with the tool holder in a manner that enables the accessory tool to be oscillated with the tool holder. The work portion 4 extends from the mounting portion and is configured to perform some kind of function as the accessory tool is oscillated. For example, blade accessory tools typically have a cutting edge 5 for performing cuts as the tool is oscillated.

The work portion of accessory tools, such as a cutting edge, will inevitably become worn with use. The work portion can also be damaged through inadvertent contact with an object such as a nail during a cutting operation. The work portion is only a small part of the overall structure of the accessory tool, but, when the work portion becomes worn or damaged, the entire accessory tool is no longer useful. What is needed is a blade configuration that does not require the extra material, fabrication, and processing required to incorporate a mounting interface onto the tool so that the blade could be manufactured at lower cost, and a blade attachment system that enables such blades to be used with the standard tool interface.

DRAWINGS

FIG. 7 is a bottom perspective view of the oscillating tool, blade attachment system, and blade of FIG. 1.

FIG. 8a depicts the blade attachment system with a blade in a locked position.

FIG. 8b depicts the blade attachment system of FIG. 8a being moved toward an unlocked position.

FIG. 8c depicts the blade attachment system of FIGS. 8a and 8b in an unlocked position.

FIG. 8d depicts the blade attachment system of FIGS. 8a-8c in an unlocked position with the blade being removed.

DETAILED DESCRIPTION

Figure 1:
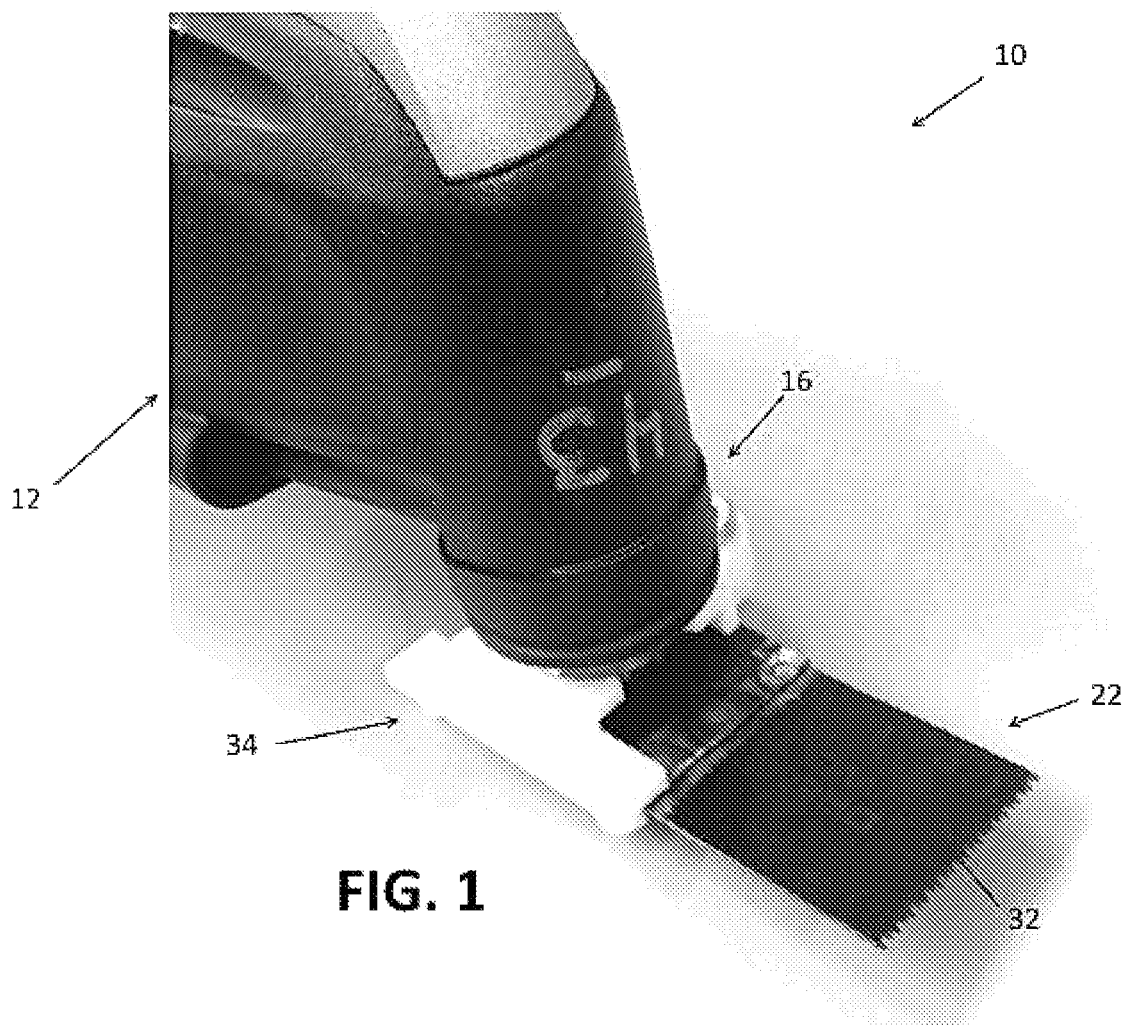
FIG. 1 is a perspective view of a front portion of an oscillating tool to which a blade attachment system and blade in accordance with the disclosure are mounted.

For the purposes of promoting an understanding of the principles of the invention, reference will now be made to the embodiments illustrated in the drawings and described in the following written specification. It is understood that no limitation to the scope of the disclosure is thereby intended. It is further understood that the disclosure includes any alterations and modifications to the illustrated embodiments and includes further applications of the principles of the disclosure as would normally occur to one of ordinary skill in the art to which this disclosure pertains.

The disclosure is directed to a blade configuration and blade attachment system for an oscillating power tool in which the blade construction is simplified by eliminating the mounting interface. This allows blades to be provided with cutting edges on each end which can be of the same type or different for different applications. The blade attachment system is configured to releasably secure the blade to the tool holder and provide a quick change capability that is not possible with prior art blade and blade attachment systems.

In accordance with one embodiment, a handheld oscillating tool is provided. The oscillating tool includes a portable housing, a motor enclosed within the housing, and a tool holder extending from the housing and configured to be oscillated by the motor about an oscillation axis. The tool holder includes an accessory attachment interface. The oscillating tool includes a blade having a planar body with a leading edge, a trailing edge, a first lateral edge, and a second lateral edge. At least one of the leading edge and the trailing edge comprises a cutting edge for the blade.

A blade attachment system is provided for securing the blade to the tool holder. The blade attachment system includes a tool mounting portion having a tool holder attachment interface. The tool holder attachment interface is configured to enable the tool mounting portion to be releasably secured to the tool holder such that the blade attachment system oscillates with the tool holder. The blade attachment system also includes a blade mounting portion configured to releasably retain the blade with the planar body arranged substantially perpendicular to the oscillation axis and with one of the leading edge and the trailing edge positioned forwardly with respect to the tool mounting portion. The tool holder and the tool mounting portion may include complementarily configured drive structures that are configured to mate. The tool mounting portion may be configured to be releasably secured to the tool holder by a fastening structure while the accessory drive structure is mated with the tool drive structure.

The blade mounting portion may be configured to retain the blade by clamping against the first and second lateral edges of the blade. In one embodiment, the blade mounting portion includes a first spacer that extends downwardly from a first lateral side of the tool mounting portion and a second spacer that extends downwardly from a second lateral side of the tool mounting portion. The first spacer includes a first planar support surface and the second spacer includes a second planar support surface. The planar body of the blade is positioned against the first and second planar support surfaces when the blade is retained by the blade mounting portion. The first spacer includes a first clamping structure that extends downwardly from the first planar support surface and the second spacer includes a second clamping structure that extends downwardly from the second planar support surface. The first clamping structure and the second clamping structure are positioned to engage the first and second lateral edges of the blade when the blade is positioned in contact with the first and second planar support surfaces.

The first clamping structure includes a cam member that is rotatably attached to the first spacer structure and a lever arm for rotating the cam member. The cam member is configured to be rotated by the lever arm to a clamping position. The cam member has a clamping surface that is configured to apply a clamping force to one of the first and the second lateral edges of the blade when the cam member is in the clamping position.

The blade attachment system enables different configurations of blades to be used. For example, in one embodiment, the leading edge and the trailing edge of the blade each comprise a cutting edge. The first clamping structure and the second clamping structure of the blade attachment system are configured to retain the blade with either the leading edge or the trailing edge facing forwardly. The first clamping structure and the second clamping structure are configured to retain the blade with the cutting edge at different positions in front of the blade mounting portion. In another embodiment, the first and the second lateral edges of the blade may also comprise cutting edges in which case the first clamping structure and the second clamping structure are configured to retain the blade with any one of the leading edge, the trailing edge, the first lateral edge, and the second lateral edge facing forwardly. In another embodiment, the cutting edges at the different edges of the blade may have different configurations. For example, in one embodiment, the leading edge may be wider than the trailing edge to provide a wider cutting edge at one end of the blade. In some embodiments, the cutting edges on different edges of the blade may have different configurations to facilitate cutting different materials.

Figure 2:
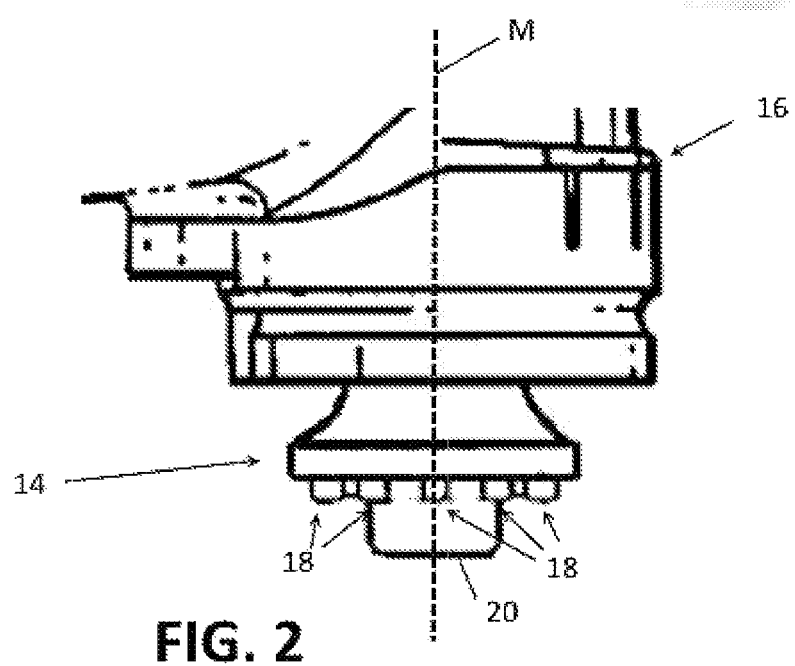
FIG. 2 is a side view of the tool holder of the oscillating tool of FIG. 1.

As depicted in FIGS. 1 and 2, an oscillating power tool 10 includes a housing 12 that serves as a hand grip for the tool 10 and an enclosure for retaining an electric motor (not shown). The electric motor oscillates a tool holder 14 extending from a nose portion 16 of the housing to which various accessory tools may be attached. As the tool holder 14 is oscillated, an accessory tool secured to the tool holder 16 is driven to perform a particular function, such as cutting, depending on the configuration of the type of accessory tool. Power for the electric motor is received from a suitable power source (not shown), such as an internal batter supply, a power cord connected to an AC wall outlet, a USB connected to an external source such as an electronic device, AC wall outlet, or in a vehicle, a wireless charging such as an inductive charging or Qi charging.

Referring to FIG. 2, the motor is configured to oscillate the tool holder 14 about an axis M at high frequencies, e.g., 5,000 to 25,000 oscillations per minute, with a small oscillating angle, typically in a range of between 0.5° and 7°. To enable a secure connection between the tool holder 14 of the power tool 10 and accessory tools for use with the power tool, the tool holder 14 is provided with a tool drive structure. The drive structure includes topographical features, such as protrusions, openings, recesses, and the like, that are arranged in a particular pattern and have predetermined sizes and shapes. In the embodiment of FIG. 2, the tool holder 14 includes a tool drive structure that comprises a plurality of protrusions 18 arranged in a circular pattern about a central bore (not shown).

Tool holder 14 includes a fastening structure 20 that is configured to retain an accessory tool on the tool holder 14. In the embodiment of FIG. 2, the fastening structure 20 comprises a clamping screw that is configured to be threaded into the central bore of the tool holder 14. The head of the clamping screw is configured to press the accessory tool against the tool holder 14 to retain the accessory tool on the tool holder. In alternative embodiments, any suitable type of fastening structure for the tool holder 14 may be used.

Figure 4:
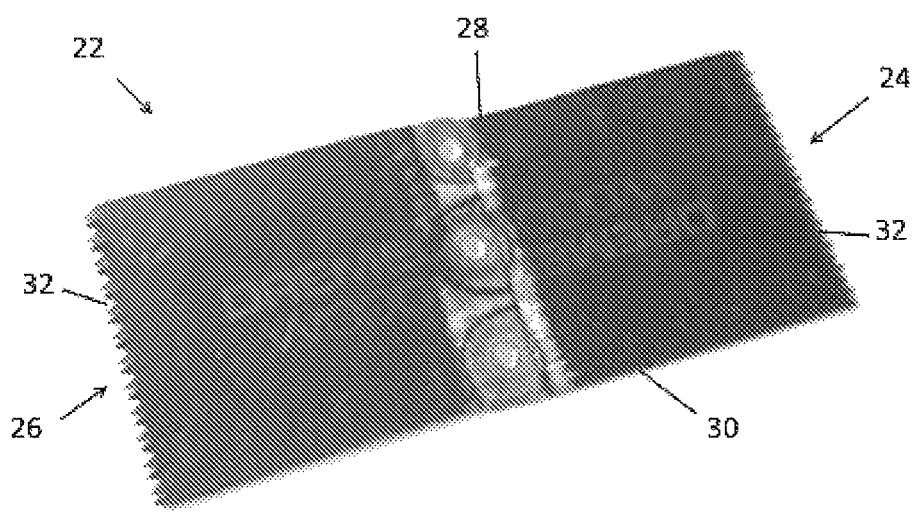
FIG. 4 depicts the blade of FIG. 1.

Referring now to FIG. 4, the blade 22 comprises a planar, rectangular-shaped body formed of a hard metal material, such as carbon steel. Other materials suitable for making a blade in order to cut a target such as wood, plastic, concrete, or the like are possible. The blade has a first end portion 24, a second end portion 26, and a pair of lateral edge portions 28, 30. At least one of the end portions comprises a cutting edge. The blade 22 is not provided with an oscillating interface for mounting the blade to the oscillating tool as is typically used in previously known blade accessory tools. Therefore, the extra material, fabrication, and assembly required to manufacture blades with integral mounting features is not needed so the cost of manufacturing the blade can be significantly reduced.

Another benefit of not requiring an oscillating interface is that the second end of the blade can now be used as an additional cutting edge. For example, as depicted in FIG. 4, the first and the second end portions 24, 26 of the blade each include a cutting edge 32. The cutting edges 32 may comprise serrated cutting edges having a plurality of cutting teeth. The cutting teeth may be formed in any suitable manner including grinding or laser cutting. The geometry of the cutting teeth can be varied from blade to blade to facilitate the cutting of different kinds of materials, such as wood and metal. The cutting edges 32 on each end of the blade may have the same configuration or different configurations to facilitate use with different kinds of material.

The blade 22 may be formed from a single piece of sheet metal. Alternatively, the blade may be formed by two separate pieces of sheet metal that are fixed together, e.g., by spot welding, ultrasonic welding, or the like. This may simplify that manufacturing process as blades with different cutting edges can be manufactured separately and then assembled with different combinations of cutting edge types. This also allows different materials to be used for different blade portions and cutting edge types to further facilitate use in different applications. Although the blade 22 is depicted as having serrated cutting edges at each end, it is also possible for one or both of the ends to have other configurations that are used with oscillating tools.

Figure 5:
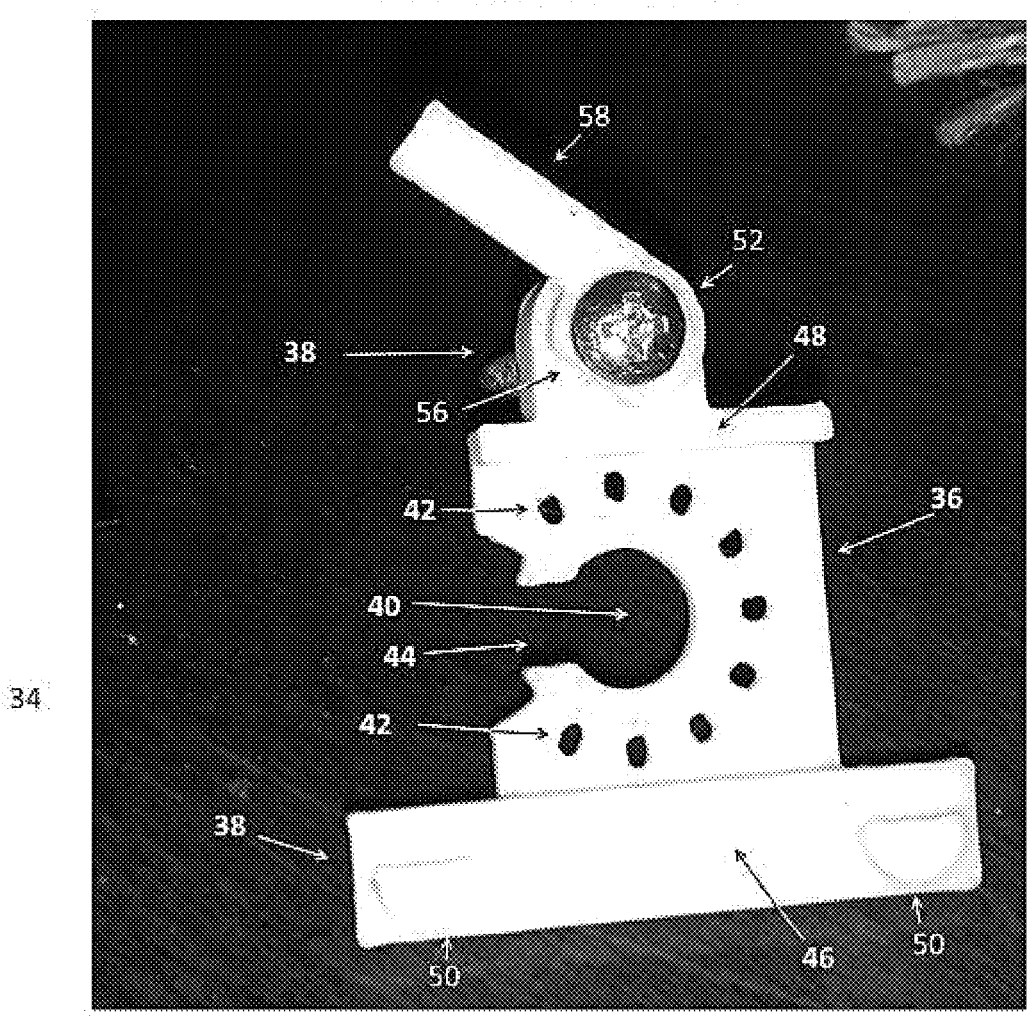
FIG. 5 depicts the blade attachment system of FIG. 1.
Figure 6:
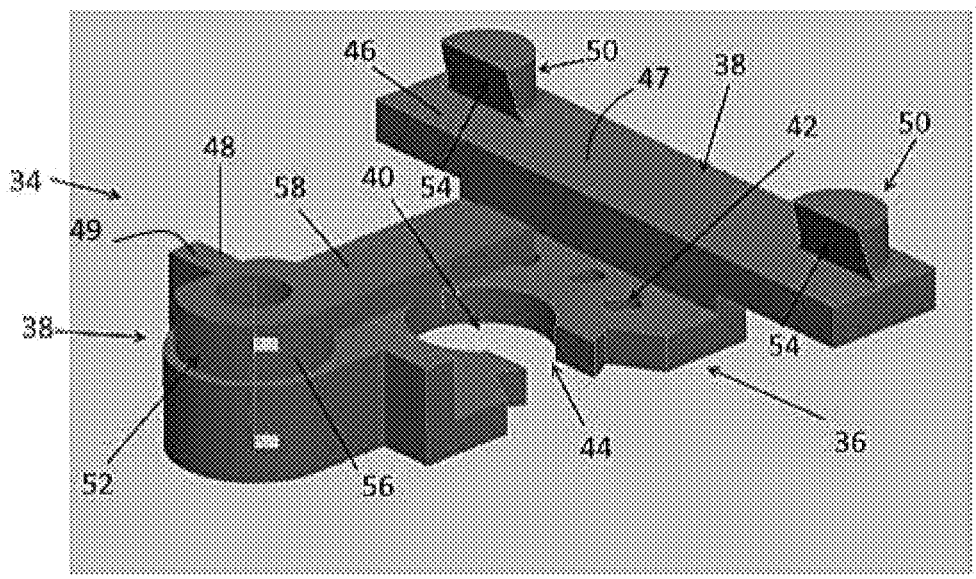
FIG. 6 is another view of the blade attachment system of FIG. 1.

The blade attachment system 34 is configured to enable the blade 22 to be releasably and securely attached to the tool holder 14 of the oscillating tool 10 as depicted in FIG. 1. Referring to FIGS. 5 and 6, the blade attachment system 34 includes a tool mount portion 36 and a blade mount portion 38. The tool mount portion 36 is configured to releasably secure the blade attachment system 34 to the tool holder 14 of the oscillating tool in a manner that enables the blade attachment system 34 to be oscillated by the tool holder 14. The blade mount portion 38 is configured to releasably secure the blade 22 to the blade attachment system 34 so the blade 22 can be oscillated along with the blade attachment system 34 by the tool holder 14 and with the blade 22 held in an appropriate position with respect to the oscillating tool 10 to perform its intended function.

Figure 3:
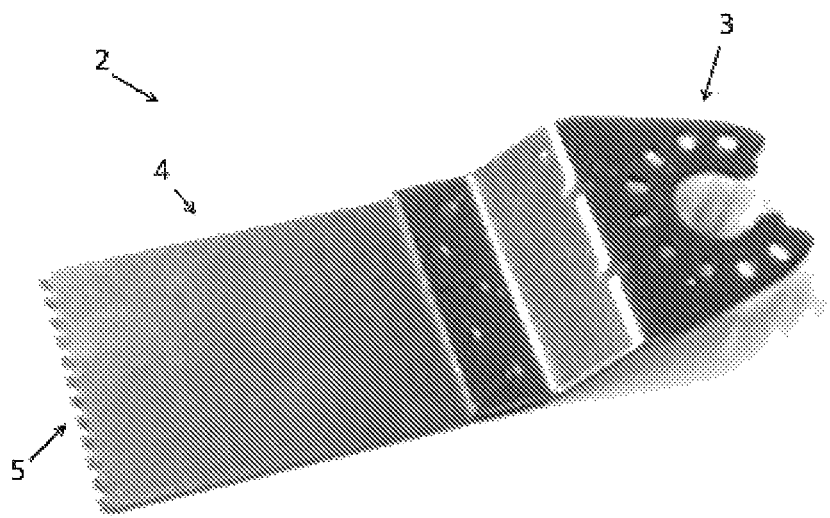
FIG. 3 depicts an accessory tool in accordance with the prior art.

The tool mount portion 36 is formed of a metal material, such as carbon steel, having a generally flat shape and includes mounting features and drive structures which are typically integrated into the accessory tools of the prior art, such as depicted in FIG. 3. The mounting features and drive structures are configured complementarily with respect to the drive structure and fastening mechanisms on the tool holder 14 of the oscillating power tool 10. In the embodiment of FIGS. 5 and 6, the tool mount portion 36 defines a central opening 40 through which the clamping screw passes prior to being engaged with a bore of the tool holder 16. The tool mount portion 38 also defines an accessory drive structure, which in this embodiment, comprises a plurality of openings 42 that are sized, shaped, and positioned complementarily with respect to the protrusions 18 on the tool holder 14.

To install the blade attachment system onto the tool holder, the tool mount portion 36 is held against the tool holder 14 with the protrusions 18 on the tool holder 14 received in the openings 42 defined in the tool mount portion 36. The clamping screw 20 is then tightened with the bore of the tool holder 14 until the head of the clamping screw 20 presses the tool mount portion 36 against the tool holder 14. As depicted in FIGS. 5 and 6, the tool mount portion 36 defines a slot 44 that extends from the central opening 40 through the outer periphery of the tool mount portion 36. The slot 44 enables the tool mount portion 36 to be installed and removed from the tool holder 14 without having to completely remove the clamping screw 20.

The blade mount portion 38 is attached to the tool mount portion 36 so that, when the tool mount portion 36 is installed on the tool holder 16, the blade mount portion 38 is arranged below, or on the bottom side of the tool mount portion 36 as can be seen in FIGS. 1 and 7. The blade mount portion 38 is configured to releasably secure the blade 22 to the blade attachment system 34 by clamping the lateral edge portions 28, 30 of the blade 22. A minimal amount of material of the blade mount portion 38 should extend below the blade 22 so as not to interfere with the operation of the blade.

Referring to FIGS. 5 and 6, the blade mount portion 38 includes a first spacer structure 46 that extends from a bottom side of the tool mount portion 36 and is arranged along one lateral side of the tool mount portion 36. A second spacer structure 48 extends from the bottom side of the tool mount portion 36 along the opposite lateral side of the tool mount portion. The spacer structures 46, 48 include planar bottom surfaces 47, 49, respectively, that are aligned with each other and provide a support surface against which one of the major surfaces of the blade 22 is placed when mounting the blade 22 to the blade attachment system 34. The support surfaces of the spacer structures 46, 48 are used to space the blade 22 apart from the blade mount portion in order to provide clearance for the interlocking engagement of the drive structures 18, 42 and the head of the clamping screw 20.

The spacer structures 46, 48 are spaced apart from each other a distance that is less than the width of the blade 22 between the lateral edges 28, 30 so that the blade 22 can be placed against the support surfaces of each spacer structure with the blade spanning the tool mount portion 36 of the blade attachment system 34. A first clamping structure 50 is provided on the first spacer structure 46 in position to engage one lateral edge of the blade 22, and a second clamping structure 52 is provided on the second spacer structure 48 in position to engage the opposite lateral edge of the blade 22. At least one of the first and second clamping structures is configured to move toward the other until the clamping structures 50, 52 engage the lateral edges of the blade 22 and apply a sufficient amount of pressure to retain the blade 22 therebetween.

In the embodiment of FIGS. 5 and 6, the first clamping structure 50 comprises a pair of posts that protrude from the first spacer structure 46 at positions where they can engage a lateral edge of the blade at two spaced apart locations. The posts 50 each include an inner facing clamping surface 54 for engaging the lateral edge of the blade 22. The second clamping structure 52 comprises a cam member that is rotatably supported on the second spacer structure 48. The cam member has a cam surface 56 that is positioned adjacent the lateral edge of the blade 22. The cam member is rotated to bring different segments of the cam surface 56 into position facing the lateral edge of the blade. At least one of the segments of the cam surface 56 is configured to press against the lateral edge of the blade 22 so that the opposite lateral edge of the blade is forced into engagement with the clamping surface 54 on the other side of the blade.

The cam member 52 includes a lever arm 58 to facilitate turning of the cam. FIGS. 8a-8d depict the clamping structures in various states of operation. In FIG. 8a, the cam member 52 is rotated into a locked position at which the first segment of the cam member 52 applies pressure to the blade which forces the blade into engagement with the clamping surfaces of the posts on the opposite side of the blade. FIG. 8b shows the lever arm being rotated away from the locked position toward an unlocked position. FIG. 8c shows the lever arm and cam in an unlocked position. In this position, the cam surface provides clearance for the blade to be removed from the blade mount portion as depicted in FIG. 8d.

To facilitate a secure attachment of the blade 22 to the blade mount portion 38, the clamping surfaces which engage the lateral edge of the blade may be inclined or tapered inwardly from the outer edge to the base of the clamping surface so that force is applied on the blade toward the support surfaces to ensure that the blade seats flat on the support surface when clamped. As can be seen in the FIG. 6, for example, the clamping surfaces 54 on the posts 50 are tapered inwardly to help seat the blade 22 against the support surfaces. The cam surface 56 may also be tapered inwardly in this manner at least in the first segment to help press the blade against the support surface.

The blade mount portion 38 of the blade attachment system 34 enables the blade 22 to be secured to the tool holder with either cutting edge facing forward. In addition, the blade can be secured to the blade mount portion with the cutting edge at different positions in front of the blade mount portion so the blade length is adjustable. The blade mount portion 38 also provides a quick change functionality as all that is required to install and remove a blade from the blade mount portion is a turn of the cam. The blade attachment system also enables weight to be strategically incorporated into certain locations to act as a counterbalance for reducing vibrations.

Although a specific lever arm with a cam have been described therein, other possible components for facilitating locking/unlocking of the blade from the blade attachment system are possible. In one embodiment, a push button with a biasing element may be used to release the blade from the system. For example, the button is pressed once to lock the blade in place and presses the button again to unlock the blade from the blade attachment system.

Figure 9:
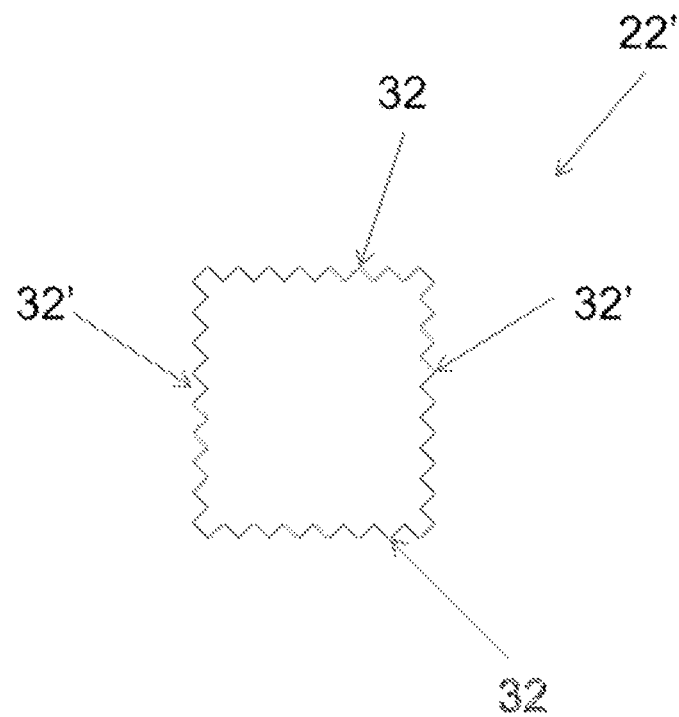
FIG. 9 illustrates an exemplary blade according to various embodiments.

FIG. 9 illustrates a second embodiment of an exemplary blade for a power tool 10. The blade 22' is similar to the blade 22 depicted in FIG. 4, except the blade 22' include two cutting edges 32' formed longitudinally. Extra cutting edges 32' can be used as additional cutting edge when the cutting edges 32 are worn out or damaged after some time. In the embodiment, the blade 22' is formed from a single piece of sheet metal. Other materials suitable for making a blade in order to cut a target such as wood, plastic, concrete, or the like are possible.

Figure 10:
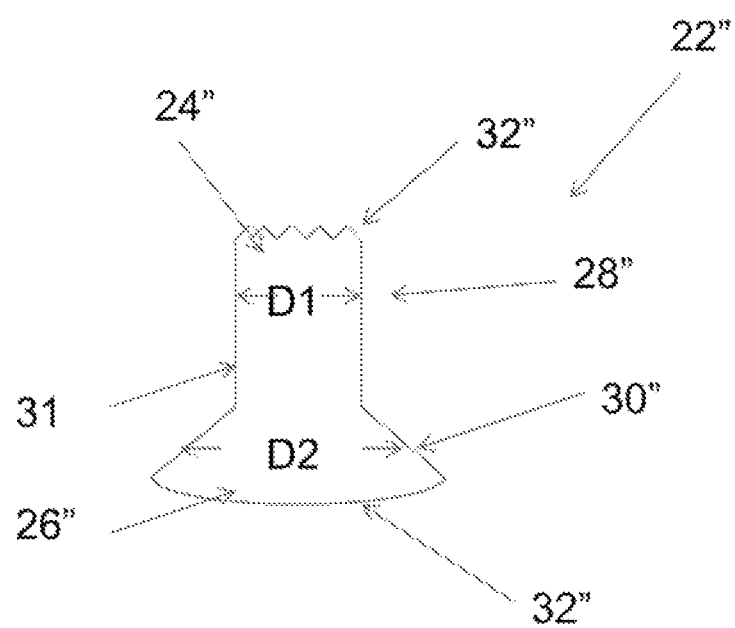
FIG. 10 illustrates another exemplary blade according to various embodiments.

FIG. 10 illustrates a third embodiment of an exemplary blade for a power tool 10. The blade 22' includes cutting edges 32" on both end portions 24", 26" of a first working portion 28" and a second working portion 30", respectively. The cutting edges 32' is configured to facilitate in the cutting of different type of targets. As depicted, the first working portion 28" has a width D1 narrower than a width D2 of the second working portion 30". The width D1 of the working portion 28" corresponds to the mounting space formed between the spacer structures 46, 48 of the blade attachment 34 of FIGS. 5 and 6. The blade 22", once coupled to the support surfaces of the spacer structure 46, 48, is secured by rotating the lever arm 58 towards the blade 22" into a lock position. To release the blade 22", the lever arm 58 is rotated away from the blade 22" at a locked position into an unlocked position. Although a specific implementation of the blade attachment system has been described herein, a person of ordinary skill in the art can readily see that the configuration of the mounting and clamping mechanisms and the arrangement of components can be modified in a variety of ways to perform the basic function of securing the blade to the tool holder of the oscillating power tool. The disclosure is intended to encompass all such modifications.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A handheld oscillating power tool comprising:
   a portable housing;
   a motor enclosed within the housing;
   a tool holder extending from the housing and configured to be oscillated by the motor about an oscillation axis, the tool holder including a tool drive structure that is configured to interlock with an accessory drive structure on an accessory mounting portion of an accessory tool for use with the oscillating power tool; and
   a fastening structure configured to hold the accessory mounting portion of the accessory tool against the tool holder;
   a blade having a planar body with a leading edge, a trailing edge, a first lateral edge, and a second lateral edge, at least one of the leading edge and the trailing edge comprising a cutting edge; and
   a blade attachment system including:
      a tool mounting portion having the accessory drive structure for interlocking with the tool drive structure of the tool holder and being configured to be held against the tool holder by the fastening structure while the accessory drive structure of the tool mounting portion is interlocked with the tool drive structure of the tool holder such that the tool mounting portion oscillates with the tool holder; and
      a blade mounting portion configured to releasably retain the blade with the planar body of the blade arranged substantially perpendicular to the oscillation axis and with one of the leading edge and the trailing edge positioned forwardly with respect to the tool mounting portion when the tool mounting portion is secured onto the tool holder,
   wherein the blade mounting portion includes a first spacer that extends downwardly from a first lateral side of the tool mounting portion and a second spacer that extends downwardly from a second lateral side of the tool mounting portion,
   wherein the first spacer includes a first planar support surface and the second spacer includes a second planar support surface,
   wherein the planar body of the blade is positioned against the first and second planar support surfaces when the blade is retained by the blade mounting portion,
   wherein the first spacer includes a first clamping structure that extends downwardly from the first planar support surface and the second spacer includes a second clamping structure that extends downwardly from the second planar support surface, and
   wherein the first clamping structure and the second clamping structure are positioned to engage the first and second lateral edges of the blade when the blade is positioned in contact with the first and second planar support surfaces.

2. The power tool of claim 1, wherein the first clamping structure includes a cam member that is rotatably attached to the first spacer structure and a lever arm for rotating the cam member, the cam member being configured to be rotated by the lever arm to a clamping position, and
   wherein the cam member has a clamping surface that is configured to apply a clamping force to one of the first and the second lateral edges of the blade when the cam member is in the clamping position.

3. The power tool of claim 2, wherein the leading edge and the trailing edge of the blade each comprise a cutting edge, and
   wherein the first clamping structure and the second clamping structure are configured to retain the blade with either the leading edge or the trailing edge facing forwardly.

4. The power tool of claim 3, wherein the first clamping structure and the second clamping structure are configured to retain the blade with the cutting edge at different positions in front of the blade mounting portion.

5. The power tool of claim 3, wherein the first and the second lateral edges each comprise cutting edges, and
   wherein the first clamping structure and the second clamping structure are configured to retain the blade with any one of the leading edge, the trailing edge, the first lateral edge, and the second lateral edge facing forwardly.

6. The power tool of claim 3, wherein the leading edge is wider than the trailing edge.

7. The power tool of claim 3, wherein the cutting edge on the leading edge and the cutting edge on the trailing edge have different configuration to facilitate cutting of different materials.

8. A blade attachment system for an oscillating power tool, the blade attachment system comprising:

a tool mounting portion configured to be mounted onto a tool holder of an oscillating power tool such that the tool mounting portion oscillates with the tool holder and a fastening structure, the tool holder including a tool drive structure that is configured to interlock with an accessory drive structure provided on an accessory mounting portion of an accessory tool for use with the oscillating power tool, the fastening structure being configured to hold the mounting portion of the accessory tool against the tool holder, wherein the tool mounting portion includes the accessory drive structure for interlocking with the tool drive structure of the tool holder and is configured to be held against the tool holder by the fastening structure while the accessory drive structure of the tool mounting portion is interlocked with the tool drive; and a blade mounting portion attached to the tool mounting portion and configured to releasably retain a blade, the blade having a planar body with a with a leading edge, a trailing edge, a first lateral edge, and a second lateral edge, at least one of the leading edge and the trailing edge comprising a cutting edge, the blade mounting portion being configured to retain the blade with the planar body arranged substantially perpendicular to an oscillation axis of the tool holder and with one of the leading edge and the trailing edge positioned forwardly with respect to the tool mounting portion when the tool mounting portion is secured onto the tool holder, wherein the blade mounting portion includes a first spacer that extends downwardly from a first lateral side of the tool mounting portion and a second spacer that extends downwardly from a second lateral side of the tool mounting portion, wherein the first spacer includes a first planar support surface and the second spacer includes a second planar support surface, wherein the planar body of the blade is positioned against the first and second planar support surfaces when the blade is retained by the blade mounting portion, wherein the first spacer includes a first clamping structure that extends downwardly from the first planar support surface and the second spacer includes a second clamping structure that extends downwardly from the second planar support surface, and wherein the first clamping structure and the second clamping structure are positioned to engage the first and second lateral edges of the blade when the blade is positioned in contact with the first and second planar support surfaces.

9. The blade attachment system of claim 8, wherein the first clamping structure includes a cam member that is rotatably attached to the first spacer structure and a lever arm for rotating the cam member, the cam member being configured to be rotated by the lever arm to a clamping position, and wherein the cam member has a clamping surface that is configured to apply a clamping force to one of the first and the second lateral edges of the blade when the cam member is in the clamping position.

10. The blade attachment system of claim 9, wherein the first clamping structure and the second clamping structure are configured to retain the blade with the cutting edge at different positions in front of the blade mounting portion.

\* \* \* \* \*